(12) United States Patent
Arbesman et al.

(10) Patent No.: US 8,348,025 B2
(45) Date of Patent: Jan. 8, 2013

(54) PISTON-SIDE BRAKE SHIM

(76) Inventors: Ray Arbesman, Toronto (CA); Nghi Pham, Concord (CA)

( * ) Notice: Subject to any disclaimer, the term of this patent is extended or adjusted under 35 U.S.C. 154(b) by 332 days.

(21) Appl. No.: 12/625,393

(22) Filed: Nov. 24, 2009

(65) Prior Publication Data

US 2010/0133050 A1 Jun. 3, 2010

(30) Foreign Application Priority Data

Nov. 28, 2008 (CA) ..................................... 2645460

(51) Int. Cl.
*F16D 65/097* (2006.01)
(52) U.S. Cl. ................ 188/73.36; 188/73.37; 188/264 G
(58) Field of Classification Search ............... 188/73.35, 188/73.36, 73.37, 73.38, 264 G; 92/158, 92/159, 172, 248
See application file for complete search history.

(56) References Cited

U.S. PATENT DOCUMENTS

| | | | | |
|---|---|---|---|---|
| 3,684,061 A * | 8/1972 | Ogawa et al. | .............. | 188/73.37 |
| 4,155,430 A | 5/1979 | Kawamura | | |
| 4,513,844 A * | 4/1985 | Hoffman, Jr. | ............. | 188/264 G |
| 4,537,289 A * | 8/1985 | VonGrunberg et al. | ... | 188/264 G |
| 4,722,424 A | 2/1988 | Ikeuchi | | |
| 4,846,312 A | 7/1989 | Sweetmore et al. | | |
| 4,928,579 A * | 5/1990 | Emmett | ...................... | 188/73.38 |
| 4,995,482 A | 2/1991 | Kobayashi et al. | | |
| 5,509,508 A | 4/1996 | Evans | | |
| 5,706,917 A | 1/1998 | Matsuzaki | | |
| 5,713,435 A * | 2/1998 | Schneider et al. | ........ | 188/264 G |
| 5,988,044 A * | 11/1999 | Meyer | ....................... | 188/264 G |
| 6,116,384 A | 9/2000 | Matsumoto et al. | | |
| 6,170,620 B1 | 1/2001 | Akita et al. | | |
| 6,213,257 B1 | 4/2001 | Yano et al. | | |
| 6,479,413 B1 | 11/2002 | Booher | | |
| 7,237,659 B2 | 7/2007 | Murayama | | |
| 2003/0213658 A1 * | 11/2003 | Baba | ........................ | 188/73.37 |
| 2004/0163903 A1 | 8/2004 | Saka | | |

FOREIGN PATENT DOCUMENTS

| | | | |
|---|---|---|---|
| EP | 0138081 A | 4/1985 |
| EP | 0322530 A | 7/1989 |
| EP | 1591688 A | 11/2005 |
| EP | 1600654 A1 | 11/2005 |
| GB | 2018373 A | 10/1979 |
| GB | 2022733 A | 12/1979 |
| GB | 2127918 A | 4/1984 |
| GB | 2129511 A | 5/1984 |
| GB | 2161226 A | 1/1986 |
| JP | 6129451 A | 5/1994 |
| JP | 6207631 A | 7/1994 |
| JP | 7208516 A | 8/1995 |
| JP | 921434 A | 1/1997 |
| JP | 1019068 A | 1/1998 |
| JP | 1026156 A | 1/1998 |
| JP | 10196688 A | 7/1998 |
| JP | 1226687 A | 8/2001 |
| JP | 5114012 A | 4/2005 |
| JP | 6125418 A | 5/2006 |

\* cited by examiner

*Primary Examiner* — Thomas J Williams
(74) *Attorney, Agent, or Firm* — Patterson & Sheridan, LLP

(57) ABSTRACT

The present invention is a shim or shim assembly that clips onto a brake caliper piston. It is generally a rimmed round (disc or annular) shape to cap the edges of the caliper piston and includes surface features for lubrication, and improved fitting. Reduced noise from frictional fretting is provided along with protection of piston's outer rim. Reduced thermal transfer into the piston is also provided.

28 Claims, 2 Drawing Sheets

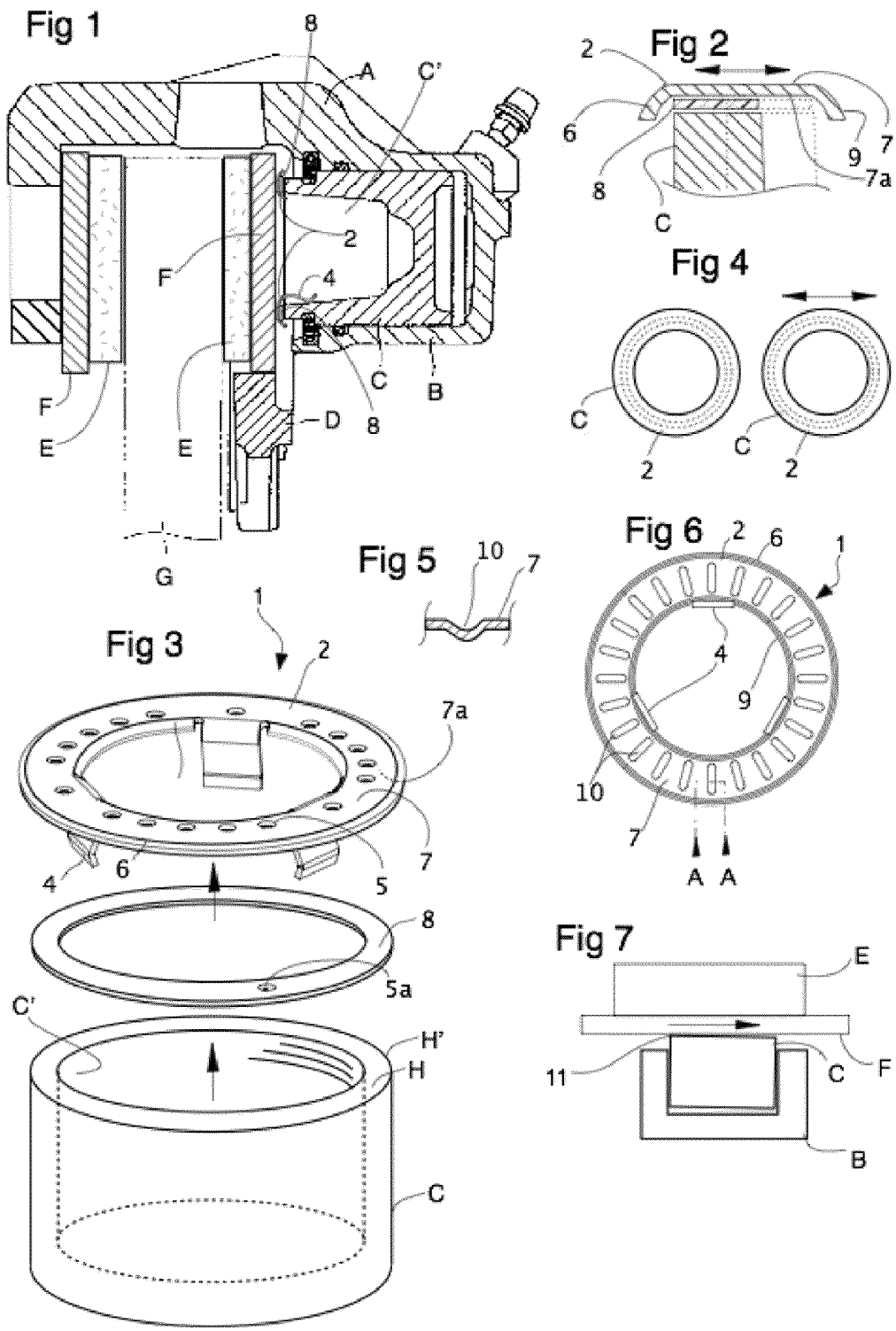

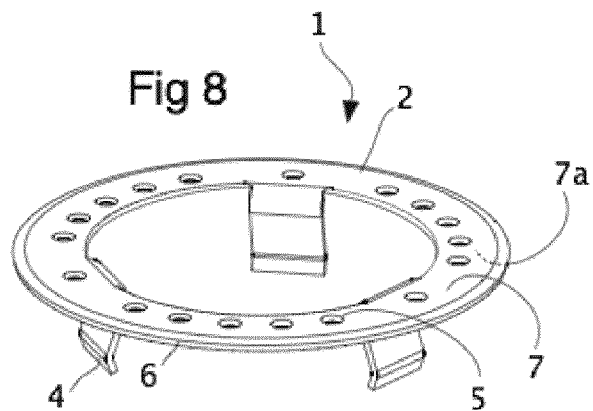
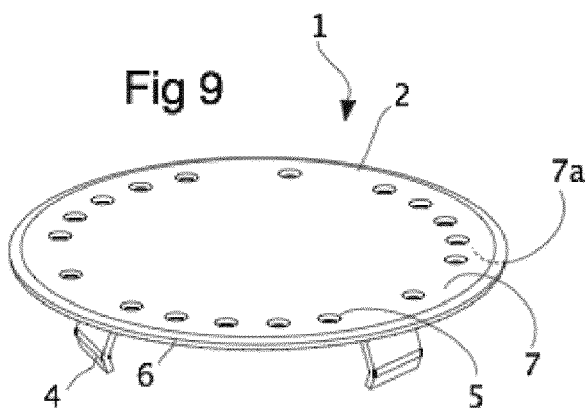
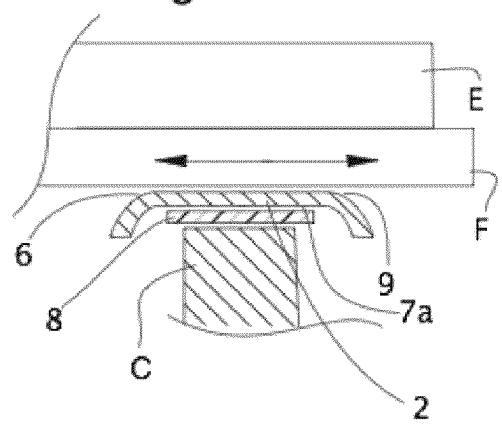

PISTON-SIDE BRAKE SHIM

CROSS-REFERENCE TO RELATED APPLICATIONS

This application claims benefit of Canadian patent application number 2,645,460, filed Nov. 28, 2008, which is herein incorporated by reference.

BACKGROUND OF THE INVENTION

1. Field of the Invention

The invention relates to noise-reducing shims for disc brake systems, and more particularly relates to shims for mounting on the brake piston.

2. Description of the Related Art

In a disc brake caliper, a hydraulically actuated piston forces, by action and reaction, a pair of opposing brake pads to pinch a rotor attached to a vehicle wheel. Brake pads have a stiff backing plate with friction pads affixed to one side. Shims of a thin material are often used on the side of the plate contacted by the piston. The shim's function is to reduce the frequency of occurrence of a loud and annoying squeal noise from what are otherwise mechanically perfect brakes. At least some of the noise comes from the fact that, to prevent jamming, the plate has some freedom of radial movement within the caliper so that the rotor can be freed, while the piston has little freedom of movement.

In braking, the rigid rotor is frictionally engaged by the hard brake pad (which is in turn supported by its hard backing plate). The brake pad can frictionally slide to some degree against the rigid piston and caliper.

High frictional forces are generated during this sliding movement which can cause squeal. Like a stick of chalk forced at an angle across a rigid board, friction can lead to very severe vibrational noise. As well, these recurring forces can lead to fretting and chipping of the piston rim. A great many designs of shims have been tried over the years to fit between the piston and the plate to reduce such friction and resulting squeal. None have been entirely satisfactory.

Brake squeal is a very expensive problem for car and brake manufacturers as customers invariably want the noise remedied under warranty even though the brakes are otherwise perfect.

Shims are typically designed to fit against the backing plate of the brake pad. Almost every separate vehicle model has a unique backing plate size and shape. This requires large and therefore expensive inventories.

Piston-side shims are less well-known, but have certain advantages. One advantage is that there are fewer variations in piston size and shape across vehicle models.

However, existing piston-side shims are bulky and have undesirably complex manufacturing requirements. Further, such piston-side shims are not designed to optimize smooth sliding potential against the brake backing plate, and accordingly may not be effective in reducing vibrational noise. It would desirable to allow the shim to slide smoothly against the backing plate to reduce the undesirable friction. At the same time, the shim must be maintained in a secured and well-located state on the piston edge to prevent the piston edge from becoming exposed on one edge when contacted with the backing plate (i.e. to prevent scraping and fretting of the piston edge which can lead to damage).

SUMMARY OF THE INVENTION

According to a first aspect of the invention, a piston-side shim is provided for use on a brake piston having a hollow open end. The shim has a round plate portion for substantially covering at least the contact edges of the hollow open end of the brake piston. This plate has a brake plate facing surface and a piston facing surface. Preferably, an outside edge of the plate is bent or curved toward the piston facing surface (e.g. forming a lip on the outside edge). The shim also has a plurality of piston engaging clips cut from the plate and bent or curved at an angle to the plate, which engage an interior portion of the hollow open end of the brake piston to retain the round plate on the brake piston.

The plate may be disc-shaped (i.e. having a solid round surface) or annular (i.e. having a ring-shaped surface bounded by concentric outside and inside edges). Preferably, the plate has a larger diameter than the outer diameter of the open end of the brake piston, the outside edge of the plate extending outside and around an outer edge of the open end of the piston. The diameter of the plate is preferably such that the outside edge of the plate is spaced away from the outer edge of the open end of the piston.

In the annular embodiment, the piston engaging clips are preferably bent or curved down from the inside edge. Preferably, the inside edge is also bent or curved toward the piston facing surface (similar to the outside edge).

The inside edge diameter of the annular embodiment is preferably smaller than the inside diameter of the hollow open end of the brake piston. The inside edge diameter of the annulus is preferably such that the inside edge of the annulus can be spaced away from the inner edge of the open end of the piston. Thus, the width of the solid portion of the annulus should be sufficient to cover the exposed edges of the brake piston at its hollow open end, with additional room for overlap. The radiused or bent inside and outside edges form boundaries to retain and guide the annulus on the piston end.

The plate facing surface may include surface features for retaining a lubricant (e.g. dimples or grooves). The surface features may be embossed (or scraped, punched or gouged) on the surface. The surface features may be disposed over the plate facing surface in a pattern or at random.

Preferably, the plate includes a plurality of perforations (such as holes or slots). These may be straight-cut through the shim or they may have a dimple profile. The perforations may be disposed over the plate in a pattern or at random.

The perforations and surface features may be combined to achieve a better lubricating effect. That is, the perforations allow the lubricant to flow through the shim toward the plate facing surface. The surface features retain the lubricant on the plate facing surface, and prevent lubricant buildup at any one spot on the surface (with bare metal in other spots), keeping the lubricant evenly distributed.

A lubricant is preferably disposed on or proximate to the piston facing surface. The perforations allow passage of the lubricant from the piston facing surface toward the plate facing surface. In one example, the shim assembly may include a lubricant-loaded element stacked with the plate proximate to the piston facing surface, which supplies lubricant through the holes or slots of the shim plate. The element may take various forms. In one example, a lubricant-loaded washer may conveniently be stacked with the shim plate.

Other secondary stacking elements may also be conveniently used with the shim plate. These may be used to provide additional noise-reduction or thermal conductivity. Again, these may be washer-shaped. Preferably, the secondary stacking elements (or lubricant-loaded stacking elements) are sized slightly smaller than the shim plate to fit snugly between the bent or radiused outer (and inner) edges of the shim plate.

BRIEF DESCRIPTION OF THE DRAWINGS

FIG. 1 shows a cross-section of a brake caliper and rotor assembly with the main shim and washer shim (together, shim assembly) fitted onto the open end of the hollow caliper piston.

FIG. 2 is a cross section of one portion of the shim assembly nested on top of a portion of the piston's rim and where the dotted outline shows how the shim can move laterally across the rim when dragged by contact with the plate that can move during braking.

FIG. 3 shows a perspective of the main shim with the depending clips and the auxiliary washer below.

FIG. 4 shows how the main shim (or shim assembly) (solid lines) can slide against the piston rim (dotted outline) to better accommodate the plate movement during braking.

FIG. 5 shows a cross section at A-A of FIG. 4 showing a possible dimple formation.

FIG. 6 shows a top view of the shim where the flat portion has been dimpled to provide lubrication reservoirs and a conformable structure.

FIG. 7 depicts how a piston may have high-pressure edge-contact whenever the backing plate is dragged radially by the rotating rotor, which causes the piston to cant slightly in the caliper cylinder.

FIG. 8 shows a perspective of an annular (washer-style) embodiment where only the outer circumference is radiused.

FIG. 9 shows a disc-style embodiment with a radiused outer circumference under which the piston engaging clips are affixed.

FIG. 10 shows one side of the piston rim with a portion of the shim assembly and a respective portion of a brake pad and how the brake pad is free to slide laterally against the stationary piston and how the shim facilitates this relative motion.

DETAILED DESCRIPTION

In one embodiment, the instant shim is a single disc of thin spring steel with two faces. One face is substantially flat and defines the outer working surface (i.e. the brake plate facing surface). The other face is the inner working surface (i.e. the piston facing surface). It preferably has an outer curved lip or rim, or a raised and radiused flange. The resulting shim loosely caps or partially covers the hollow piston's edge rim to provide smooth moving contact between the piston and the back plate. Piston engaging clips or tongues depend from the inner working surface to frictionally engage the inner wall of the hollow piston for shim retention.

This lip or rim allows the outer working (brake plate facing) surface to skate or slide smoothly against the plate with no corners or edges that would scrape, dig in, or cause fretting action and thereby increase friction, vibration and noise. The inner working surface (which may be cup-shaped) has sufficient clearance for the piston to slide laterally within the shim and prevent the piston's outer rim dig in or fret against the plate creating friction, vibration and noise. The radiused edge also serves as a boundary to keep the shim well-located on the piston edges.

The shim may be a solid disc or a washer-shaped disc but in either case the outer rim or lip is of a size that permits it to slide across the piston rim, that is, the shim's outer diameter is greater than that of the piston, and its inner diameter less.

In the case of an annular-shaped shim, the shim's inner circumference may also be formed with a rounded rim or lip, in which case the inner rim's diameter will be small enough to enable the above described sliding motion on the piston rim.

The annular shim design may alternatively have its inner circumference left plain or flat with no rim.

In all embodiments, the shim's working surface may be multi-featured to provide operational benefits. It may have perforations (such as holes or slots) or other formed shapes to hold a supply of lubricant and reduce heat transfer. Raised features on the working surface may be used to compensate for minor out-of-perpendicular alignment of the piston and plate. The surfaces may be coated with a range of compounds or platings such as rubber, lubricants or adhesives. These features can be chosen to benefit vibration, noise and wear reduction in accordance with the rest of the brake system's design.

The shim may also be stacked with other subsidiary shims/washers (or be made of several stacked layers). These layered shims (or washers) preferably have inside and outside diameters sized to slide within the main shim's inner working surface (i.e. piston facing surface) within the confines of the rimmed circumference(s). This washer shim can also have features related to friction, vibration and thermal transfer reduction by being of, for example, a composite material and may have additional lubrication features complementing those outlined above.

The main shim and the optional washer shim may have various surface coatings applied to further remedy noise creation. Such coatings could include a rubbery material to dampen vibration and reduce heat transfer into the piston or a lubricating coating to reduce friction.

In all embodiments, piston engaging clips depend from the shim to engage the inner walls of the caliper's hollow piston. These are preferably cut and bent from the same workpiece as the shim (to save manufacturing steps and attendant cost). However, it is contemplated that the piston engaging clips could alternatively be separately formed and assembled to the shim (e.g. by spot welding).

Turning to the drawings, FIG. 3 shows the exploded view of a piston and shim assembly 1. The main shim 2 includes washer shim 8 and depending piston engaging clips 4. Main shim 2 may be fabricated from a springy material such as thin sheet steel. Spaced clips 4 depending from main shim 2 compress on entering the hollow piston C whereafter they extend to frictionally grip the interior wall C' of piston C. Washer shim 8, which may be included in the shim assembly 1 can be made of a variety of materials including metals, or plastics or composites having a suitable service temperature. In the case of a lubricant-loaded washer element, the material may be a textile dosed or embedded with lubricant (e.g. felt).

FIG. 1 shows a sectioned brake caliper A with the main shim 2 and washer shim 8 (together, shim assembly 1) located between the piston C and the brake pad backing plate F which has bonded friction pad E adjacent brake rotor G. Caliper piston C has hollow center C' and slideably fits in caliper cylinder B which is part of caliper A. Caliper A slideably connects to a caliper carrier and to a vehicles suspension system via bosses D (only one shown). When the brake is applied, piston C is forced from cylinder B, and, simultaneously, caliper A is made to slid on caliper pins (not shown). This action causes the two opposing brake pads to pinch rotor G slowing its rotation.

On the piston side of caliper A, the outer rim H of piston C presses washer shim 8 against main shim 2 (together, shim assembly 1) which in turn forces plate F and pad E (right side in drawing) against rotor G.

Due to the requirement that pads not jam or lock in the caliper body, there is provided a certain amount of radial looseness before the plate F stops against a thrust surface on the caliper body. It follows that since the piston C is in contact with plate F, there is some side thrust on piston C. FIG. 7 exaggeratedly shows how the piston C can cant slightly in its cylinder due to a small but real clearance therebetween. This leads to a high pressure contact point 11 therebetween which can damage the piston rim H edge H' at places from repeated high frictional forces.

FIG. 10 shows a sectioned view of how main shim 2 and washer shim 8 provide a radiused outer working surface that allows it to skate or slide smoothly with plate F across the piston rim H protecting rim edge H'.

FIG. 2 shows a side view of one small portion of piston C and shim assembly 1 in the radial direction of its travel. The dotted outline shows the alternate position of where piston C would be if shim assembly 1 or main shim 2 is dragged by plate F across it. In other words, shim assembly 1 (or simply, main shim 2) allows independent motion of plate F and piston rim H to reduce chipping and fretting of rim H'. As can be seen in the Figure, outer 6 and inner 9 radiused lips of shim 2 provide boundaries to keep the shim well-located on the piston face.

FIG. 6 shows a face view of one of many contemplated features that can be formed into the outer surface 7 on inner surface 7a of main shim 2. The formed features may include holes 5 (FIG. 3) and dimples 10 (FIG. 6). FIG. 5 is a section view of the dimple in FIG. 6 at A-A. The features may include be a circular ring groove or any other suitable patterning. Such features may be used as wells or reservoirs to hold lubricants, adhesives or other compounds deemed suitable for brake squeal elimination. Such features may also be formed in washer 8 for similar or complementary purposes.

The features shown in FIGS. 3 and 4 and discussed above may also be used to accommodate the slight misalignment between the planes of piston rim H and plate F. That is, such raised feature will compress variably (more or less) around the circumference of surface 7 leaving a slightly wedged disc shape thereby conforming to perpendicular disparity between plate F and piston rim H. Because such features cannot be absolutely flattened under braking force, their value as wells for compounds remains.

The features shown in FIGS. 3, 4, 5 and in washer shim 8 in FIGS. 1, 2, 3, 10 can also serve as heat transfer inhibitors because any reduction in surface contact area between two surfaces will reduce the rate of heat transfer. This is beneficial to keep brake fluid from becoming overheated and boiling with potentially disastrous loss of brakes.

For washer shim 8 this heat transfer reduction can be further exploited by using a plastic such as phenolic laminate of fabric including glass, or PEEK (poly ether ether ketone) or others with suitable high temperature and strength requirements.

Various coatings can also be applied to surfaces 7 and 7a as well as to both surfaces of washer shim 8 in order to help reduce the occurrence of brake squeal. Fluid-type lubricants, dry lubricants, heat released lubricants, adhesives and frictional compounds are all contemplated to reduce brake squeal.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

The invention claimed is:

1. A piston-side shim for use on a brake piston having a hollow open end and having a rim, the shim comprising:
   a round plate for substantially covering at least the rim of the hollow open end of the brake piston, the plate having a brake plate facing surface and a piston facing surface, an outside edge of the plate being bent or curved toward the piston facing surface; and
   a plurality of piston engaging clips cut from the plate and bent or curved at an angle to the plate for engaging an interior portion of the hollow open end of the brake piston to retain the round plate on the brake piston,
   wherein the outer diameter of the plate is greater than the outer diameter of the hollow open end of the brake piston to permit the piston facing surface of the plate to slide across the piston rim.

2. The shim of claim 1, wherein the outside edge comprises a lip.

3. The shim of claim 1, wherein the plate comprises a disc.

4. The shim of claim 1, wherein the plate has a larger diameter than the outer diameter of the open end of the brake piston, the outside edge of the plate extending outside and around an outer edge of the open end of the piston.

5. The shim of claim 4, wherein the diameter of the plate is such that the outside edge of the plate is spaced away from the outer edge of the open end of the piston.

6. The shim of claim 1, wherein the plate is an annulus.

7. The shim of claim 6, wherein the annulus has an inside edge concentric with the outside edge.

8. The shim of claim 7, wherein the piston engaging clips are bent or curved down from the inside edge.

9. The shim of claim 7, wherein the inside edge is bent or curved toward the piston facing surface.

10. The shim of claim 7, wherein the annulus has a smaller inside edge diameter than the inside diameter of the hollow open end of the brake piston.

11. The shim of claim 7, wherein the inside edge diameter of the annulus is such that the inside edge of the annulus can be spaced away from the inner edge of the open end of the piston.

12. The shim of claim 1, wherein the plate facing surface includes surface features for retaining a lubricant.

13. The shim of claim 12, wherein the surface features are dimples or grooves.

14. The shim of claim 1, wherein the plate facing surface is embossed with surface features for retaining a lubricant.

15. The shim of claim 1, wherein the plate includes a plurality of perforations.

16. The shim of claim 15, wherein the perforations are holes or slots.

17. The shim of claim 15, wherein the perforations have a dimple profile.

18. The shim of claim 15, further comprising a lubricant disposed on or proximate to the piston facing surface, the perforations allowing passage of the lubricant from the piston facing surface toward the plate facing surface.

19. The shim of claim 15, further comprising a lubricant-loaded element stacked with the plate proximate to the piston facing surface, the perforations allowing passage of lubricant from the lubricant-loaded element toward the plate facing surface of the plate.

20. The shim of claim 19, wherein the lubricant-loaded element is a lubricant-loaded washer.

21. The shim of claim 1, further comprising a secondary stacking element stacked with the plate proximate to the piston facing surface, the secondary stacking element providing additional noise-reduction or thermal conductivity factors.

22. The shim of claim 21, wherein the secondary stacking element is at least one washer.

23. The shim of claim 1, wherein at least one surface of the plate is coated with a rubbery material to dampen vibration and reduce heat transfer into the piston.

24. A piston-side shim for use on a brake piston having a hollow open end and having a rim, the shim comprising:
   an annular plate for covering at least the rim of the hollow open end of the brake piston, the plate having a brake plate facing surface and a piston facing surface, an outside edge of the plate being bent or curved toward the piston facing surface; and
   a plurality of piston engaging clips cut from the plate and bent or curved at an angle to the plate for engaging a hollow inside portion of the brake piston to retain the plate on the brake piston,
   wherein the outer diameter of the plate is greater than the outer diameter of the hollow open end of the brake piston to permit the piston facing surface of the plate to slide across the piston rim.

25. A piston-side shim for use on a brake piston having a hollow open end and having a rim, the shim comprising:
   an annular plate for covering at least the rim of the hollow open end of the brake piston, the plate having a brake plate facing surface and a piston facing surface, the plate defining a plurality of perforations; and
   a plurality of piston engaging clips cut from the plate and bent or curved at an angle to the plate for engaging a hollow inside portion of the brake piston to retain the plate on the brake piston,
   wherein the outer diameter of the plate is greater than the outer diameter of the hollow open end of the brake piston to permit the piston facing surface of the plate to slide across the piston rim.

26. The shim of claim 25, further comprising a lubricant defined on or proximate to the piston facing surface, the perforations allowing passage of lubricant from the piston facing surface toward the plate facing surface.

27. The shim of claim 25, further comprising a lubricant-loaded element stacked with the plate proximate to the piston facing surface, the perforations allowing passage of lubricant from the lubricant-loaded element toward the plate facing surface of the plate.

28. The shim of claim 27, wherein the lubricant-loaded element is a lubricant-loaded washer.

* * * * *